United States Patent [19]

Alexander

[11] Patent Number: 4,493,506
[45] Date of Patent: Jan. 15, 1985

[54] VEHICLE ROCKER PANEL STRUCTURE

[75] Inventor: Michael P. Alexander, Grosse Ile, Mich.

[73] Assignee: American Sunroof Corporation, Southgate, Mich.

[21] Appl. No.: 362,629

[22] Filed: Mar. 29, 1982

[51] Int. Cl.³ .............................................. B62D 27/02
[52] U.S. Cl. .................................... 296/209; 296/204; 293/128
[58] Field of Search ............... 296/209, 185, 40, 187, 296/188, 189, 193, 198, 203, 204, 208; 293/128

[56] References Cited

U.S. PATENT DOCUMENTS

| | | | |
|---|---|---|---|
| 2,012,057 | 8/1935 | Swallow | 296/28 |
| 2,833,589 | 5/1958 | Ahrens | 296/44 |
| 2,997,329 | 8/1961 | Chapman | 296/209 |
| 3,084,972 | 4/1963 | Gibson et al. | 296/28 |
| 3,423,122 | 1/1969 | Wessells | 296/185 |
| 3,495,673 | 2/1970 | Yazejian | 180/64 |
| 3,580,628 | 5/1971 | Rantana | 293/128 |
| 3,684,311 | 8/1972 | Pierce | 280/152 R |
| 3,776,589 | 12/1973 | Barenyi et al. | 296/28 R |
| 4,029,353 | 6/1977 | Barenyi et al. | 296/28 R |

Primary Examiner—Robert R. Song
Attorney, Agent, or Firm—Basile, Weintraub & Hanlon

[57] ABSTRACT

A support structure for a vehicle includes a first support member positioned below and secured to the underside of the vehicle rocker panel. In one embodiment, a portion of the first support member extends laterally outward from the rocker panel and is secured to an exterior vertical portion of the rocker panel. A decorative member is secured to the side of the vehicle and is adapted to overlie a portion of the first support member. A second support member is alternately secured to the interior side of the rocker panel to increase the structural strength of the support structure.

10 Claims, 3 Drawing Figures

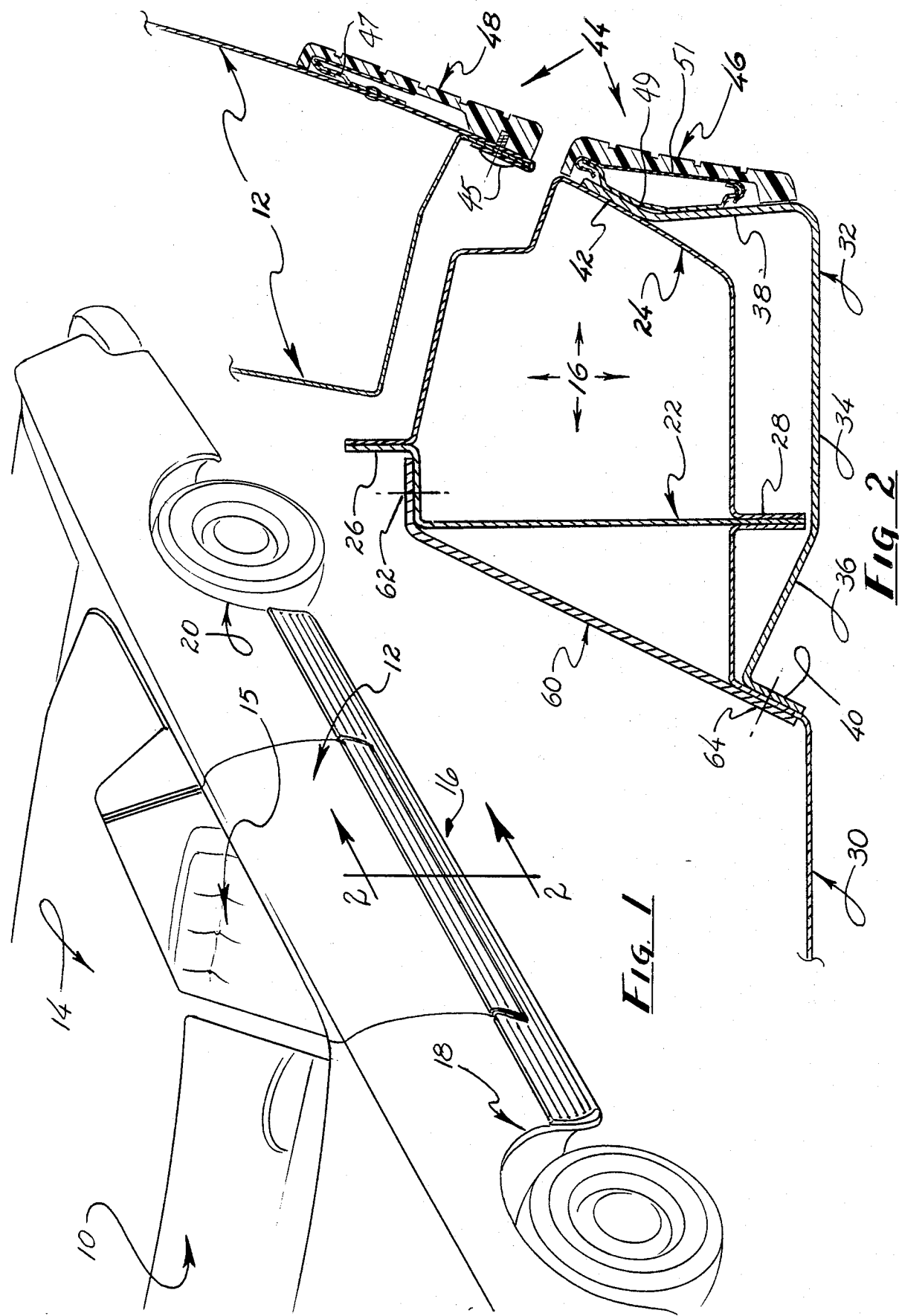

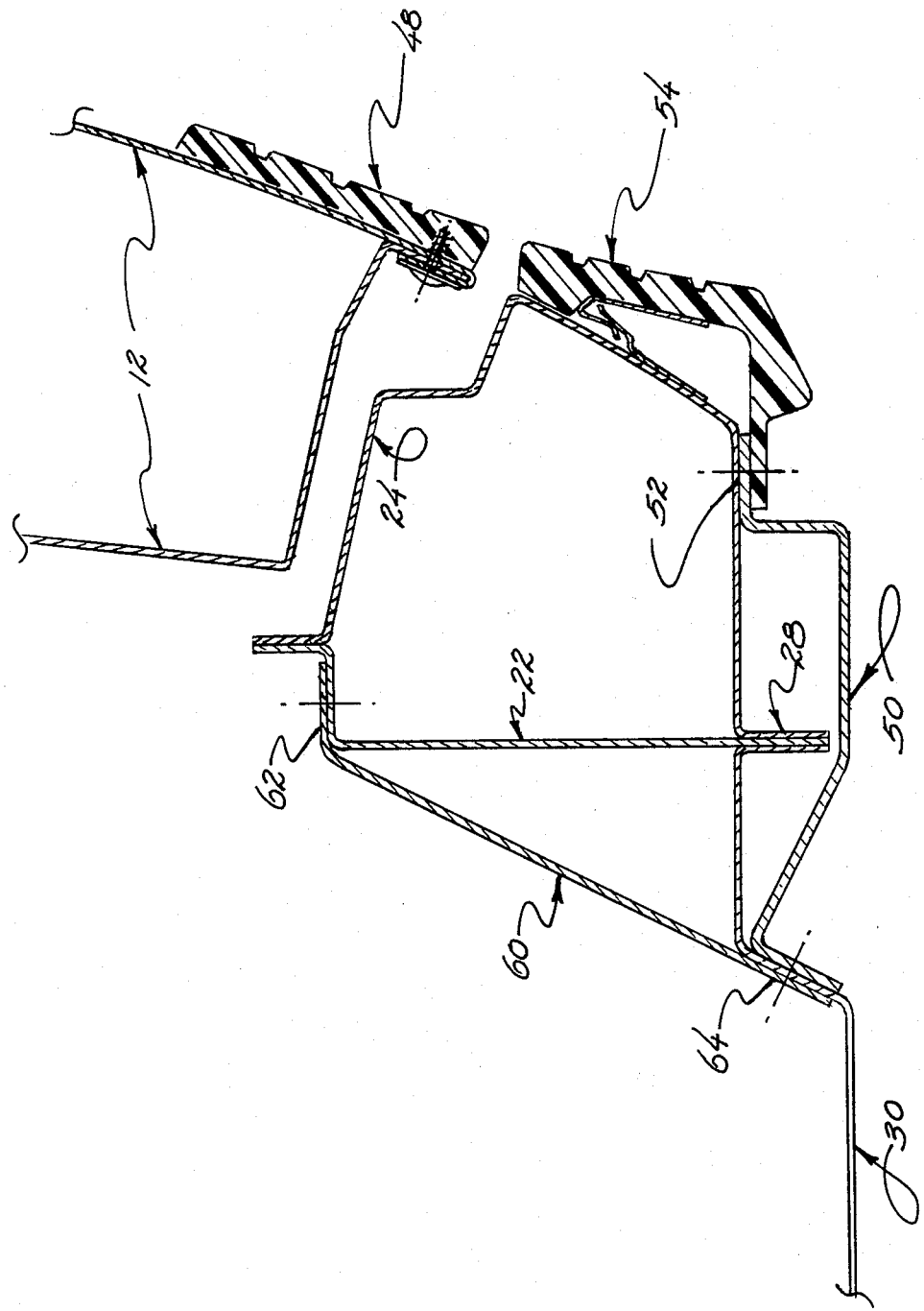

VEHICLE ROCKER PANEL STRUCTURE

BACKGROUND OF THE INVENTION

1. Field of the Invention

This invention relates, in general, to motor vehicle body support structures and, more specifically, to motor vehicle rocker panel support structures.

2. Description of the Prior Art

In a modern automobile vehicle, the lower side of the passenger compartment is defined by a member, commonly known as a "rocker panel", which extends longitudinally below the side door. The rocker panel serves to reinforce the body compartment floor of the vehicle. For strength purposes, the rocker panel is formed with a hollow, tubular cross-section, either constructed in a single piece tubular section or built up on inner and outer panels which are joined together to form the desired tubular beam.

The shape of the beam and thickness of the individual panels forming the rocker panels are selected to provide the requisite supporting strength for the vehicle. In today's "unibody" type of vehicle construction, the rocker panels cooperate with the body side walls, compartment floor and roof to form an integral structure which provides support integrity for the body compartment of the vehicle. In a "unibody" type of vehicle initially designed to carry a convertible-type folding roof or other type of removable roof portions, the loss of supporting strength due to the lack of a rigid roof panel is compensated for by increasing the thickness of the rocker panel walls or altering and enlarging the beam cross section.

Such modifications to the rocker panels are not possible where an existing hard-top vehicle is modified to accept a convertible-type folding roof or removable portion(s) of a sedan type roof. In such a vehicle modification, additional support strength is achieved by adding stiffening members interiorly to the rocker panel to increase the beam cross section or to insert tubular members longitudinally with the hollow rocker panel. It has been common in previous convertible-top or removable roof panel vehicle modifications to add such additional strengthening members interiorly to the rocker panels so as not to alter the exterior vehicle body lines. However, such modifications to the rocker panels are costly and, due to the smaller vehicles which are being constructed today, insufficient space is available to position the strengthening members interiorly on the rocker panels of the vehicle.

Thus, it would be desirable to provide a support structure for a vehicle which provides increased support strength for the vehicle. It would also be desirable to provide a support structure for a vehicle which provides sufficient structural strength such that a convertible-type folding roof or removable panel(s) may be installed on the vehicle. It would also be desirable to provide a support structure for a vehicle which is adapted to be installed on an existing vehicle. Finally, it would be desirable to provide a support structure for a vehicle which provides a pleasing exterior appearance when installed on the vehicle.

SUMMARY OF THE INVENTION

There is disclosed herein a unique support structure for a vehicle which provides increased structural support for the vehicle such that a convertible-type folding roof or removable panel(s) in a rigid roof structure may be mounted thereon. The support structure includes a first support member which is positioned below and secured to the rocker panel of the vehicle. At least a portion of the first support member extends laterally outward from the rocker panel and is secured to an exterior portion of the rocker panel. The first support member preferably has a channel-like cross section with outer flanges to create a hollow tubular beam when secured to the rocker panel.

A decorative member is secured to the lower exterior of the vehicle and is adapted to overlie at least a part of the exterior portion of the first support member to provide a pleasing exterior appearance on the vehicle.

In an alternate embodiment, a second supporting member is secured to the interor side of the rocker panel to alter the beam cross section of the rocker panel and provide increased support strength.

The support structure of the present invention overcomes many of the problems encountered with previous attempts to increase the support strength of an existing vehicle when it is desired to modify the vehicle to accept a convertible-type folding top or removable roof panel(s). The support structure of the present invention is easy to install and, since it is installed below the rocker panel with a portion secured to the exterior portion of the rocker panel, it is advantageously useable on smaller vehicles which lack sufficient interior space to add additional strengthening members. Furthermore, the decorative member, which overlies at least a portion of the first support member, provides a smooth contour and a pleasing aesthetic appearance for the support structure of the present invention.

BRIEF DESCRIPTION OF THE DRAWING

The various features, advantages and other uses of the present invention will become more apparent by referring to the following detailed description and drawing in which:

FIG. 1 is a perspective view of a vehicle having a support structure constructed in accordance with the teachings of the present invention mounted thereon;

FIG. 2 is a cross sectional view, generally taken along line 2—2 in FIG. 1, showing one embodiment of the support structure of the present invention; and FIG. 3 is a cross sectional view, similar to FIG. 2, showing another embodiment of the support structure of the present invention.

DESCRIPTION OF THE PREFERRED EMBODIMENTS

Throughout the following description and drawing, identical reference numbers are used to refer to the same component shown in multiple figures of the drawing.

Referring now to the drawings, and to FIG. 1, there is illustrated a motor vehicle 10. The motor vehicle 10 is of conventional construction and includes, in part, side doors 12, internal support structure and a convertible-type folding roof or a sedan type rigid roof structure having removable panel(s) 14 which surround and form an interior body compartment 15.

An essential part of the vehicle support structure comprises rocker panels 16, FIGS. 1 and 2, which extend longitudinally along the lower sides of the vehicle 10 between the front and rear wheel openings 18 and 20. The rocker panels 16, which are identically constructed and are disposed on opposite sides of the vehicle are positioned below the side doors 12 and define the lower edge of the door opening.

Each rocker panel 16 has a hollow, rectangular cross section which, by way of illustration and not limitation, is formed of inner and outer members 22 and 24 which are secured together at upper and lower flanges 26 and 28, be welding or riveting, to form a hollow, beam-like cross section. The lower flanges 28 of the rocker panel 16 are in turn secured by welding or riveting, to the underbody 30 of the vehicle 10.

According to one embodiment of the present invention, the support structure includes a first support member 32 which is adapted to be positioned below and secured to the underside of the rocker panel 16. Preferably, the first support member 32 has a channel-like configuration formed of a flat base portion 34, upwardly extending side walls 36 and 38 and outwardly extending flanges 40 and 42. The first support member 32 is positioned with the flat base portion 34 located beneath the rocker panel 16, with one outer flange 40 located proximate the underbody 30 and adapted to be secured thereto by conventional means, such as by welding or riveting. The opposite flange 42 of the first support member 32 is positioned and extends upwardly and outwardly from the side walls 38 and is secured to an exterior portion of the rocker panel 16 by any conventional means, such as by welding or riveting. By constructing the first support member with a channel-like cross section, a hollow, tubular beam is formed when the first support member 32 is secured to the rocker panel 16 which serves to increase the support strength of the entire rocker panel 16 of the vehicle 10.

As shown in FIG. 2, a decortive means 44 is secured to a lower, exterior side of the vehicle 10 and is adapted to overlie at least a portion of the first support member 32 so as to cover at least a portion of the first support member 32 and provide a pleasing exterior appearance on the vehicle 10. According to a preferred embodiment, the decorative means 44 comprises a two part assembly including a first or lower decorative member 46 which is secured to the lower portion of the vehicle and a second or upper decorative member 48 which is secured to the lower edge of the door 12.

Any suitable fastening means may be employed to secure the upper and lower decorative members 46 and 48 to the vehicle 10. By way of example and not limitation, the upper decorative member 46 is secured to the lower edge of the vehicle door 12 by means of a screw 47 which extends through the door panel hem into the decorative member 48. The upper edge of the upper member 48 snaps over a clip 47 which is welded or riveted to the door 12.

Similarly, the lower decorative member 46 snaps over a clip 49 which is mounted on the vehicle. The lower member 46 has a clip 51 integrally attached thereto which engages the clip 49 to mount the lower decorative member 46 in position on the vehicle 10. Alternately, other fasteners, clips or adhesives may be employed to affix the decorative members 46 and 48 on the vehicle 10.

The upper and lower decorative members 46 and 48 are formed so as to provide a continuous strip along the lower side of the vehicle 10 as shown in FIG. 1. The decorative members 46 and 48 may be formed of any suitable material, such as plastic or a metallic foil, and may be provided with decorative contours and colors as desired to match or contrast with the vehicle 10.

An alternate embodiment of the support structure of the present invention is illustrated in FIG. 3 and is suited for use on vehicles which would not require the structural reinforcements of the magnitude afforded by the previous embodiment depicted in FIG. 2. In this embodiment, the first support member 50 has a reduced width so as to confine the appearance and position of the support member 50 completely under the vehicle 10. The outermost flange 52 of the first support member 50 contacts the horizontal portion of the rocker panel 16 rather than the vertical outer surface of the rocker panel 16 as illustrated in the embodiment shown in FIG. 2. A decorative member 54 is secured to the outermost portion of the first support member 50 and overlies a portion thereof to cover the securing welds or rivets used to secure the outer edge of the first member 50 to the rocker panel 16 and to provide a pleasing smooth contoured surface for the support structure of the present invention. The use of the upper decorative member 48 is optional in this embodiment since the contour of the lower decorative member 54 may be altered to present a reduced thickness section at its upper edge.

As shown in both FIGS. 2 and 3, the support structure of the present invention alternately includes a second support member 60 which is adapted to be secured to the interior side of the rocker panel 16. The second support member 60 is secured at a first end 62 to the interior portion of the rocker panel 16 and at a second end to the underbody 30. The second support member 60 is shaped so as to define a hollow beam-like cross section when it is secured to the rocker panel 16. This adds additional strength to the support structure of the vehicle 10.

In summary, there has been disclosed a unique support structure for a vehicle which adds increased support strength for the vehicle. In this manner, a convertible-type folding roof or removable panel(s) may be installed on the vehicle with the vehicle retaining sufficient support structure for the body compartment. The support structure of the present invention is constructed so as to be installed on an existing vehicle without extensive and costly modifications. In addition, the support structure of the present invention is constructed so as to be mounted to an exterior portion of an existing rocker panel which enables its use on smaller vehicles. The support structure of the present invention also includes a decorative member which is secured to the lower side of the vehicle and is adapted to overlie a portion of the support structure to provide a pleasing appearance on the vehicle.

What is claimed is:

1. In a vehicle having an original rocker panel including at least one load-bearing member extending longitudinally along a lower side thereof, the improvement comprising:
   an added first support member, positioned below and secured to the exterior of the original rocker panel member a lower portion of the added first support member extending laterally outward from the original rocker panel and the upper portion of the added first support member being secured directly to an exterior vertical surface of the original rocker panel.

2. The improvement of claim 1 wherein the added first support member is formed with a channel-like cross section having outer flanges, the added first support member defining a hollow beam structure when secured to the original rocker panel at the outer flanges.

3. The improvement of claim 1 further including:
a decorative member secured to an exterior side of the vehicle and adapted to overlie at least a portion of the first added support member.

4. The improvement of claim 1 further including:
a second added support member secured to the interior side of the original rocker panel.

5. In a vehicle having a hollow rocker panel extending longitudinally along a lower side thereof, the improvement comprising:
a first support member positioned below and secured to the rocker panel; and
a second support member secured to the interior side of the rocker panel which is adapted to define a hollow beam-like structure when secured to the rocker panel.

6. A support structure for a vehicle comprising:
(a) a hollow original rocker panel extending longitudinally along a lower side of the vehicle;
(b) a first added support member positioned below and secured to the original rocker panel a lower portion of the added first support member extending laterally outward from the original rocker panel and the upper portion of the added first support member being secured directly to an exterior vertical surface of the original rocker panel.

7. The support structure of claim 6 wherein the first added support member is formed with a channel like cross section having outer flanges, the first added support member defining a hollow beam structure when secured to the rocker panel at the outer flanges.

8. The support structure of claim 6 further including:
a decorative member secured to an exterior side of the vehicle and adapted to overlie at least a portion of the first added support member.

9. The support structure of claim 6 further including:
a second added support member secured to the interior side of the original rocker panel.

10. A support structure for a vehicle comprising:
(a) a hollow rocker panel extending longitudinally along a lower side of the vehicle;
(b) a first support member positioned below and secured to the rocker panel; and
(c) a second support member secured to the interior side of the rocker panel, shaped to define a hollow beam-like structure when secured to the rocker panel.

* * * * *